(12) United States Patent
Dassano et al.

(10) Patent No.: US 9,168,795 B2
(45) Date of Patent: Oct. 27, 2015

(54) TYRE SENSOR DEVICE

(75) Inventors: Gianluca Dassano, Turin (IT); Ladislau Matekovits, Turin (IT); Mario Orefice, Turin (IT); Guillermo Vietti, Turin (IT)

(73) Assignees: PIRELLI TYRE S.P.A., Milan (IT); POLITECNICO DI TORINO, Turin (IT)

( * ) Notice: Subject to any disclaimer, the term of this patent is extended or adjusted under 35 U.S.C. 154(b) by 293 days.

(21) Appl. No.: 13/639,591

(22) PCT Filed: Apr. 7, 2011

(86) PCT No.: PCT/EP2011/055410
§ 371 (c)(1),
(2), (4) Date: Oct. 5, 2012

(87) PCT Pub. No.: WO2011/124636
PCT Pub. Date: Oct. 13, 2011

(65) Prior Publication Data
US 2013/0025751 A1 Jan. 31, 2013

(30) Foreign Application Priority Data

Apr. 9, 2010 (IT) .............................. MI2010A0606

(51) Int. Cl.
*H01Q 9/26* (2006.01)
*B60C 23/04* (2006.01)
*H01Q 1/22* (2006.01)

(52) U.S. Cl.
CPC ......... *B60C 23/0408* (2013.01); *B60C 23/0433* (2013.01); *H01Q 1/2241* (2013.01); *H01Q 9/26* (2013.01); *B60T 2240/03* (2013.01); *Y10T 152/10* (2015.01)

(58) Field of Classification Search
CPC .... H01Q 9/26; H01Q 1/2241; B60C 23/0408; B60C 23/0433
USPC .................................. 343/713, 711, 712, 720
See application file for complete search history.

(56) References Cited

U.S. PATENT DOCUMENTS

| 4,911,217 A | 3/1990 | Dunn et al. |
|---|---|---|
| 6,580,363 B1 | 6/2003 | Wilson |

(Continued)

FOREIGN PATENT DOCUMENTS

| EP | 1 713 021 A1 | 10/2006 |
|---|---|---|
| FR | 2 911 712 A1 | 7/2008 |

(Continued)

OTHER PUBLICATIONS

International Search Report from the European Patent Office for International Application No. PCT/EP2011/055410, mailing date Jun. 21, 2011.

(Continued)

*Primary Examiner* — Hoanganh Le
(74) *Attorney, Agent, or Firm* — Finnegan, Henderson, Farabow, Garrett & Dunner, L.L.P.

(57) ABSTRACT

A sensor device adapted to be associated with a vehicle wheel includes a package enclosing at least one sensor and an electronic data processing apparatus and at least one antenna arranged on the package for at least one among the wireless transmission of data generated by the electronic apparatus and the wireless reception of data to be provided to the electronic apparatus. The at least one antenna is shaped to adhere to surfaces of the package.

17 Claims, 13 Drawing Sheets

(56) References Cited

U.S. PATENT DOCUMENTS

| | | | |
|---|---|---|---|
| 6,781,561 | B2 | 8/2004 | Huang et al. |
| 7,250,914 | B2 | 7/2007 | Kish et al. |
| 7,421,321 | B2 * | 9/2008 | Breed et al. ............ 701/33.6 |
| 7,679,501 | B2 * | 3/2010 | Dixon et al. ............ 340/447 |
| 2003/0080918 | A1 | 5/2003 | Forster et al. |
| 2003/0080919 | A1 | 5/2003 | Forster et al. |
| 2003/0117334 | A1 | 6/2003 | Forster et al. |
| 2004/0017321 | A1 * | 1/2004 | Benedict et al. ............ 343/741 |
| 2004/0041739 | A1 | 3/2004 | Forster et al. |
| 2004/0263416 | A1 * | 12/2004 | Beckley et al. ............ 343/895 |
| 2006/0015286 | A1 | 1/2006 | Lu et al. |
| 2008/0143610 | A1 * | 6/2008 | Wang et al. ............ 343/702 |
| 2008/0235937 | A1 | 10/2008 | Forster et al. |
| 2010/0231360 | A1 | 9/2010 | Forster et al. |
| 2011/0159817 | A1 | 6/2011 | Sabatini et al. |

FOREIGN PATENT DOCUMENTS

| | | |
|---|---|---|
| JP | 2004-330842 | 11/2004 |
| WO | WO 99/29522 A1 | 6/1999 |

OTHER PUBLICATIONS

Brzeska, et al., "RF-Design Characterization and Modelling of Tyre Pressure Sensors", The $2^{nd}$ European Conf. on Antennas and Propagations, 2007, EUCAP 2007, pp. 1-5, (2007).

Genovesi, et al., "Double-loop antenna for wireless tyre pressure monitoring", Electronic Letters, vol. 44, No. 24, pp. 1-2, (Nov. 20, 2008).

Basat, et al., "Design and Development of a Miniaturized Embedded UHF RFID Tag for Automotive Tire Applications", Ant. Tech. Small Ant.s and Novel Metam., 2006 IEEE International Workshop, pp. 160-163, (2006).

Morishita, et al., "A folded loop antenna system for handsets", 2001 IEEE Anteannas Propag. Symp., vol. 3, pp. 440-443, (2001).

Evans, et al., "Planar Trapezoidal and Pentagonal Monopoles with Impedance Bandwidths in Excess of 10:1", Proceedings IEEE Int. Symp. Antennas Propagation, pp. 1558-1561, (1999).

Chen, "Broadband Roll Monopole", IEEE Transactions on Antennas and Propagation, vol. 51, No. 11, pp. 3175-3177, (Nov. 2003).

\* cited by examiner

TYRE SENSOR DEVICE

CROSS REFERENCE TO RELATED APPLICATIONS

This application is a national phase application based on PCT/EP2011/055410, filed Apr. 7, 2011, which claims the priority of Italian Application No. MI 2010 A 000606, filed Apr. 9, 2010, and the benefit of U.S. Provisional Application No. 61/359,715, filed Jun. 29, 2010, the content of all of which is incorporated herein by reference.

BACKGROUND OF THE INVENTION

1. Field of the invention

The present invention relates to the field of vehicle tyre sensors.

2. Description of the related art

The incorporation of electronic devices within pneumatic tyres is taking a greater importance in order to increase the safety of vehicles. Tyre electronics may include sensors and other components suitable for obtaining information regarding the behavior of a tyre, as well as various physical parameters thereof, such as for example temperature, pressure, number of tyre revolutions, vehicle speed, etc.

Such information may become useful in tyre monitoring and/or alarm systems.

Furthermore, active control/safety systems of the vehicle may be based on information sent from sensor devices included within the tyres.

Active safety systems use information about the external environment of a vehicle to change its behavior in pre-crash time period or during the crash event, with the ultimate goal of avoiding a crash altogether. Initially, active safety systems were primarily focused on improving the vehicle longitudinal motion dynamics, in particular, on more effective braking Anti-lock Braking Systems (ABS) and Traction Control (TC) systems. TC systems prevent the wheel from slipping while improving vehicle stability and steerability by maximizing the tractive and lateral forces between the vehicle's tyre and the road. These systems were followed by more powerful vehicle stability control systems, e.g., Electronic Stability Program (ESP), Vehicle Stability Control (VSC), and Dynamic Stability Control (DSC). These latter systems use both brakes and engine torque to stabilize the vehicle in extreme handling situations by controlling the yaw motion. Active suspension systems are also an important part in vehicle active safety systems. They have been traditionally designed by trading-off three conflicting criteria: road holding, load carrying and passenger comfort. The suspension system has to support the vehicle, provide directional control during handling maneuverers and provide effective isolation of passengers/payload from road disturbances.

The active safety control systems described above are based upon the estimation of vehicle dynamics variables such as forces, load transfer, tire-road friction. The more accurate and "real time" the parameter estimation, the better the overall performance of the control system. Currently, most of these variables are indirectly estimated using on-board sensors, and are not very accurate. Using measurements made by sensors fitted on the vehicle tyres would provide far more accurate estimation of the parameters relevant to the vehicle dynamics.

Setting up a system based on sensors fitted on the vehicle tyres is however a challenging task, for several reasons.

The inside of a tire is a harsh environment experiencing high accelerations (at a speed of 200 Km/hr an acceleration equal to about 3 g is experienced inside the inner liner of the tyre), and cannot be reached without taking the tire off the wheel. This situation poses very difficult problems: the high centrifugal acceleration implies that the sensor be light weight, for example not to unbalance the tyre, robust and small.

The fact that the tyre moves continuously with respect to the body of the vehicle forces to choose a wireless communication link for the communications from/to the sensors. However, the communication environment in which the sensor devices and the receiver are located is very harsh: in the immediate vicinity of a sensor device the wheel rim and the wheel arch of the car's body form two large signal reflectors. Both these parts are typically in metal and are curved in such a way that they tend to reflect incident waves back into the area, confining them. Furthermore, the radius of curvature of these two vehicle parts is of the order of the wavelength used for wireless transmission, making reflections much more complex. Also, the sensor device is inside the tyre and has to transmit through the tyre in some way: a true line of sight communication channel cannot be achieved since the tyre, being composed of a metal mesh and rubber, attenuates the signal dramatically.

Another issue is connected to the sensors' power supply; replacing the sensors' batteries is impractical because of the difficulty of reaching inside the tire. Hence, it is of primary importance that the sensor devices power consumption be as low as possible.

As disclosed in the U.S. patent application Ser. No. 12/654,705 filed on 29 Dec. 2009 and assigned to the present Applicant, herein incorporated by reference, some of the above issues can be solved by adopting a communication between sensor nodes fitted on vehicles' tyres and a sensor coordinator device fitted in the body of the vehicle exploiting Ultra Wide Band (UWB) transmission for the uplink (from the sensor nodes to the coordinator) and a narrowband transmission—such as one of the so called Industrial Scientific and Medical (ISM) radio bands—for the downlink (from the coordinator to the sensor nodes). The adoption of such communication scheme is advantageous because it allows to exploit the advantages of the UWB transmission for the uplink and at the same time the advantages of the ISM transmission for the downlink. Specifically, UWB is a technology suitable for low-cost, low-power, short-range and high-throughput wireless data transmission, which is robust against inter-symbol interference due to multi-path interference and lack of line-of-sight communications. Moreover, ISM transmission allows to strongly reduce the power consumption at the receiver side (sensor node) for the downlink, guaranteeing at the same time a sufficient throughput (which, in the downlink case, is relatively low).

Thus, by employing the solution proposed in such patent application, each sensor node—and the sensor coordinator device as well—need to be equipped with proper antenna systems, capable of transmitting and receiving both in the UWB band and in the ISM band.

The design of an antenna system to be installed on a sensor node which is destined to be fitted into a vehicle tyre is a very complex task, due to all the previously mentioned problems. Indeed, also such antenna system has to operate in a very harsh environment, which is subjected to high accelerations and that is located in the immediate vicinity of metallic bodies acting as signal reflectors. Moreover, since the sensor nodes have to be light weight and small, the antennas to be installed thereon have to fulfill very strict constraints in term of size. This size constraints force to employ miniaturized antennas whose dimensions are significantly lower than the wavelengths used in transmission and in reception; however, an antenna of such type typically has very poor performances from the bandwidth point of view. Another issue regards the presence of metallic elements in the sensor nodes themselves, which strongly degrade the antennas' performances. Indeed, since each sensor node comprises transmitting and receiving circuits, sensor circuits and at least one power source, all the metallic elements included in such electronic circuits interfere with the antenna near field, altering the impedance matching and the radiation pattern. A still further problem regards the choice of the best location on the sensor nodes where to install the antennas; indeed, in order to improve their mechanical robustness, certain portions of the sensor nodes—such as the top and the bottom ends—are preferably to be left empty.

The issue of transmitting/receiving radio signals to/by devices fitted on a vehicle tyre has already been faced in the art. For example, most of the presently available Tyre-Pressure Monitoring Systems (TPMS) use Radio Frequency Identification (RFID) devices, which are adapted to communicate through Radio Frequency (RF) signals; however, such RF signals oscillate at relatively low frequencies (e.g., few hundred of MHz) with relatively narrow bands, and thus they are not in compliance with a transmission of the UWB/ISM type.

For example, in "RF-Design Characterization and Modeling of Tyre Pressure Sensors" by Brzeska, Pontes, Chakam and Wiesbeck, *The 2nd European Conference on Antennas and Propagations*, 2007, *EuCAP* 2007, an antenna for TPMS applications is disclosed, consisting of a load monopole operating at 430 MHz.

The U.S. Pat. No. 6,781,561 discloses an antenna for a tire pressure detector structured as a coil.

In "Double loop antenna for wireless tyre pressure monitoring" by Genovesi, Monorchio and Saponara, *Electronics Letters*, Vol. 44, Issue 24, Nov. 20, 2008, the antenna is of the printed double loop type.

The U.S. Pat. No. 7,250,914 discloses a composite antenna for a tyre, which antenna is structured as large loop and located near the edge of the tyre itself.

Other known antennas suited to be employed in devices fitted in a tyre are designed to operate at even lower frequencies (hundreds of KHz or few MHz), such as the antennas disclosed in "Design and development of a miniaturized embedded UHF RFID Tag for Automotive Tire Applications", *Ant. Tech. Small Ant.s and Novel Metam*, 2006 International Workshop March 2006, in the European patent application No. EP1713021, and in the PCT patent application WO/1999/029522.

Antennas adapted to correctly operate at higher frequencies, having at the same time small size, have been recently studied. However, such antennas have been mainly designed to be employed in mobile communications handsets or similar applications, as it is disclosed in, e.g., "A folded loop antenna system for handsets", by Morishita, Kim, Koyanagi and Fujimoto, 2001 *IEEE Antennas Propag. Symp.*, vol. 3, in "Planar trapezoidal and pentagonal monopoles with impedance bandwidths in excess of 10:1", by Evans and Ammann, *Proc. IEEE Int. Symp. Antennas Propagation*, 1999, and in "Broadband roll monopole" by Chen, *IEEE Trans. Antenna Propag.*, vol. 51, no. 11.

SUMMARY OF THE INVENTION

The Applicant has found that although these latter types of antennas have central operating frequencies that may comply with the desired UWB/ISM transmission capability, and have at the same time sizes that are sufficiently small to be installed on a sensor node adapted to be fitted in a tyre, their behavior in terms of bandwidths and insensitiveness with respect to the environment and surrounding metallic element is not satisfactory.

Generally speaking, the Applicant has found that none of the presently known antennas fulfill at the same time all the following requirements:

being in compliance with USB and ISM transmissions, both in term of central frequencies and bandwidths;

having a size that is sufficiently small for being installed on a sensor node to be fitted in a vehicle tyre;

being capable of correctly operating in the harsh environmental conditions of a vehicle tyre;

having a sufficiently high impedance not to be negatively affected by the presence of close and/or surrounding metallic elements, and having a radiation pattern equivalent to that of a quasi-omnidirectional antenna.

The Applicant has found that the abovementioned requirements can be satisfied by providing a conformal antenna shaped to adhere to surfaces of the package enclosing the sensor node itself.

The shaping around the package surface allows reaching a high impedance, and thus a better shielding from the interference generated from metallic elements included in the sensor device. Moreover, antennas having substantial dimension can be accomplished, compliant with the frequencies involved in a robust tyre-vehicle wireless communication system, even with sensor device packages having small dimension. Furthermore, the shaping around the package surface allows reaching a high mechanical strength of the antenna, since the latter substantially forms a single body with package itself.

Particularly, according to an aspect of the present invention, there is provided a sensor device adapted to be associated with a vehicle wheel. The sensor device comprises a package enclosing at least one sensor and an electronic data processing apparatus. The sensor device further comprises at least one antenna arranged on the package for at least one among the wireless transmission of data generated by the electronic apparatus and the wireless reception of data to be provided to the electronic apparatus. Said at least one antenna is shaped to adhere to surfaces of the package.

Said antenna includes a transmit antenna configured to transmit said data in the form of UWB signals, and a receiving antenna configured to receive data in the form of narrowband signals.

Preferably, the package has a substantially polyhedral shape.

The transmit antenna and the receiving antenna may be essentially arranged on opposite faces of the package.

According to an embodiment of the present invention, the transmit antenna is a folded dipole antenna.

According to an embodiment of the present invention, the receiving antenna is a strip monopole antenna.

The transmit antenna comprises an upper radiator element and a lower radiator element longitudinally extending along a frontal face of the package.

According to an embodiment of the present invention, both the upper radiator element and the lower radiator element are folded around edges of the package so as to partially extend along lateral faces of the package.

The transmit antenna comprises a first and a second feeding terminals, preferably located on a top face of the package. Preferably, the top face of the package is an open face.

Said feeding terminals are connected to the electronic apparatus.

The upper radiator element includes in particular a first upper element connected to the first feeding terminal and a second upper element connected to the second feeding terminal.

The upper radiator element and the lower radiator element are connected to each other by means of corresponding linking elements.

According to an embodiment of the present invention said receiving antenna is a strip antenna comprising a first section located on a lateral face of the package and a second section located on a back face of the package.

Preferably, the second section of the receiving antenna has a rectangular shape, longitudinally extending on the back face of the package.

The receiving antenna comprises a third and a fourth feeding terminals located on a top surface of the package and coupled to the electronic apparatus.

The first section of the receiving antenna may be preferably connected to said third and fourth feeding terminals.

According to an embodiment of the present invention, the transmit antenna is configured to transmit UWB signals with a bandwidth of 500 MHz or less around a central frequency comprised between 4.2 and 4.8 GHz.

According to a further embodiment of the present invention, the receiving antenna is configured to transmit narrowband signals with a bandwidth of 100 MHz or less around a central frequency comprised between 2.4 and 2.5 GHz.

Preferably, a shielding sheet is located inside the package for shielding the transmit and receiving antennas from metallic parts located within the package.

The shielding sheet may comprise a magnetically loaded dielectric material.

The transmit antenna is preferably fed in a balanced way by the electronic apparatus through the first and second feeding terminals.

The receiving antenna is preferably fed in an unbalanced way by the electronic apparatus through the third and fourth feeding terminals.

Another aspect of the present invention relates to a vehicle wheel comprising a sensor device according to the above.

A still further aspect of the present invention relates to a vehicle tyre comprising a sensor device according to the above placed on an inner surface thereof.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1:
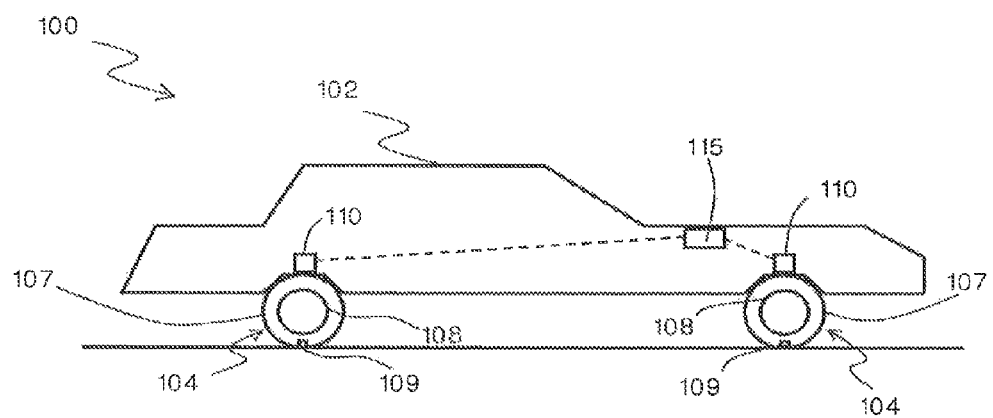
FIG. 1 schematically shows an architecture of a system of tyre sensors.

Making reference to the drawings, in FIG. 1 there is schematically shown an architecture 100 of a system of tyre sensors whose sensor nodes can be equipped with an antenna system according to an embodiment of the present invention. For example, the system of tyre sensors illustrated in FIG. 1 may be the one disclosed in the already cited U.S. patent application Ser. No. 12/654,705. FIG. 1 schematically shows a generic vehicle, identified with the reference 102, which is equipped with wheels 104 each having a tyre 107 fitted on a respective rim 108.

The main components of the system are organized in a hierarchical manner in a Personal Area Network (PAN) defined as a collection of associated and cooperating devices.

At the lowest hierarchical level, the tyre sensor devices form sensor nodes 109, located within the wheels 104—for example, inside the tyres 107—, that are responsible for data acquisition, processing and transmission to the in-vehicle equipment. The sensor devices can be accelerometers, and/or strain gauges, and/or pressure sensors, and/or temperature sensors.

Typically, a vehicle tyre comprises an internally hollow toroidal structure formed by a plurality of components, primarily by a carcass, terminating in two beads, each formed along an inner circumferential edge of the carcass, for securing the tyre to a corresponding supporting rim. At least one pair of annular reinforcing cores, called bead cores, are inserted in the said beads. The carcass is a supporting structure formed by at least one reinforcing ply which includes textile or metallic cords, axially extending from one bead to the other according to a toroidal profile, the ends of which are associated with a corresponding bead core. In radial tyres, the aforesaid cords lie essentially in planes containing the axis of rotation of the tyre. In a radially external position to the carcass, an annular structure is placed, known as belt structure, typically comprising one or more strips of rubberized fabric including metallic cords, wound on top of each other. A tread made from elastomeric material is also added, wound around the belt structure, and usually molded with a relief pattern for the rolling contact of the tyre with the road. Two sidewalls, made from elastomeric material, each extending outwards in radial direction from the outer edge of the corresponding bead, are also placed on the carcass, in axially opposed positions. In tubeless tyres the inner surface of the carcass is normally covered with at least one liner layer, i.e. with one or more layers of airtight elastomeric material. The tyre may further comprise other known elements, such as edges, strips and fillers, according to the specific design of the tyre.

The sensor node 109 is preferably placed on the internal surface of the tyre 107, for example on the inner liner surface thereof. Alternatively, the sensor node 109 may be placed on different portions of the tyre 107, or even on the surface of the rim 108 which is in contact with the tyre 107.

Figure 2:
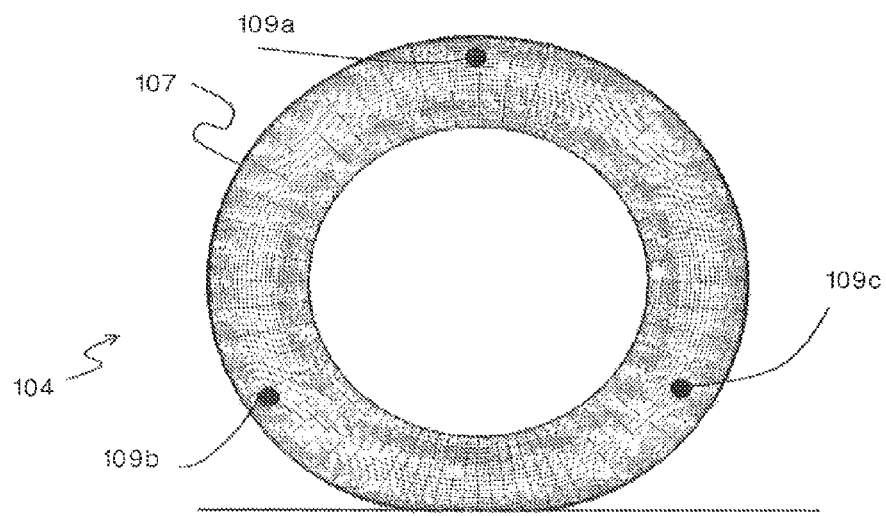
FIG. 2 schematically shows an equatorial section of a tyre having three sensor devices disposed on the liner internal surface.

One or more sensor nodes may be placed inside each tyre, to increase the accuracy and reliability of the measurements performed. For example three sensors nodes 109a, 109b, 109c may be located at an angle of 120° with respect to each other, as depicted in FIG. 2. This configuration allows improving the knowledge of spatial variation of tire/road interaction parameters. Typically, the sensor nodes 109a, 109b, 109c are located substantially on the equatorial plane of the tyre. Alternatively or in combination, in an embodiment not shown in the figures, a plurality of sensor nodes can be disposed substantially on the same meridian (or radial) plane of the tyre, with at least one of the sensor nodes located out of the equatorial plane of the tire. This configuration allows improving the knowledge of the tyre/road interaction along the whole width of the tyre footprint (i.e. of the contact region between the tyre and the road), as well as making comparisons between the measurements performed by the different sensors located substantially on the same meridian plane in order to derive information during particular maneuverers performed by the vehicle (e.g. load transfer during a bend, drift angle etc.).

Referring back to FIG. 1, at an upper level in the PAN hierarchy, one or more PAN coordinators 110 are mounted in the vehicle body. The PAN coordinators 110 are powered by the vehicle main power supply; each PAN coordinator 110 is associated with, and mounted preferably in proximity of a respective vehicle tyre 107, and manages the communication with the sensor nodes 109 in the associated tyre, receiving data from them, and mastering the synchronization of the sensor nodes' transmissions. Having one PAN coordinator 110 associated with each tyre, instead of a single, common PAN coordinator for all the tyres, allows increasing the total throughput by limiting the number of sensors controlled by each coordinator and minimizing the distance between the sensor nodes 109 and the PAN coordinator 110, for a more robust communication between these devices.

The PAN coordinators 110 can be connected to each other via a wired network, possibly exploiting a vehicle system bus such as CAN (Controller Area Network) and FlexRay.

At the highest level of the PAN hierarchy is a system control host 115, a device responsible for coordinating all PAN coordinators 110, interfacing them with the vehicle main control and providing a bridge to the vehicle system bus. The system control host 115 is responsible for transferring commands to the sensor nodes from the vehicle main control system and information acquired by the PAN coordinators 110 to the vehicle main control system via the vehicle system bus. The system control host 115 may be implemented as one of the PAN coordinators 110, having enhanced functions with respect to other PAN coordinators.

The PAN architecture has a cluster tree structure. A cluster tree structure is suitable since sensor nodes 109 do not need to communicate with each other but only with the respective PAN coordinator 110.

In order to comply with the several different and sometimes conflicting requirements mentioned in the foregoing, the system of tyre sensors provides for employing different radio technologies for the communications between the generic sensor node 109 and the respective PAN coordinator 110 in uplink (i.e., from the sensor node 109 to the PAN coordinator 110) and downlink (i.e., from the PAN coordinator 110 to the sensor node 109), as it will be discussed in detail in the following.

Figure 3A:
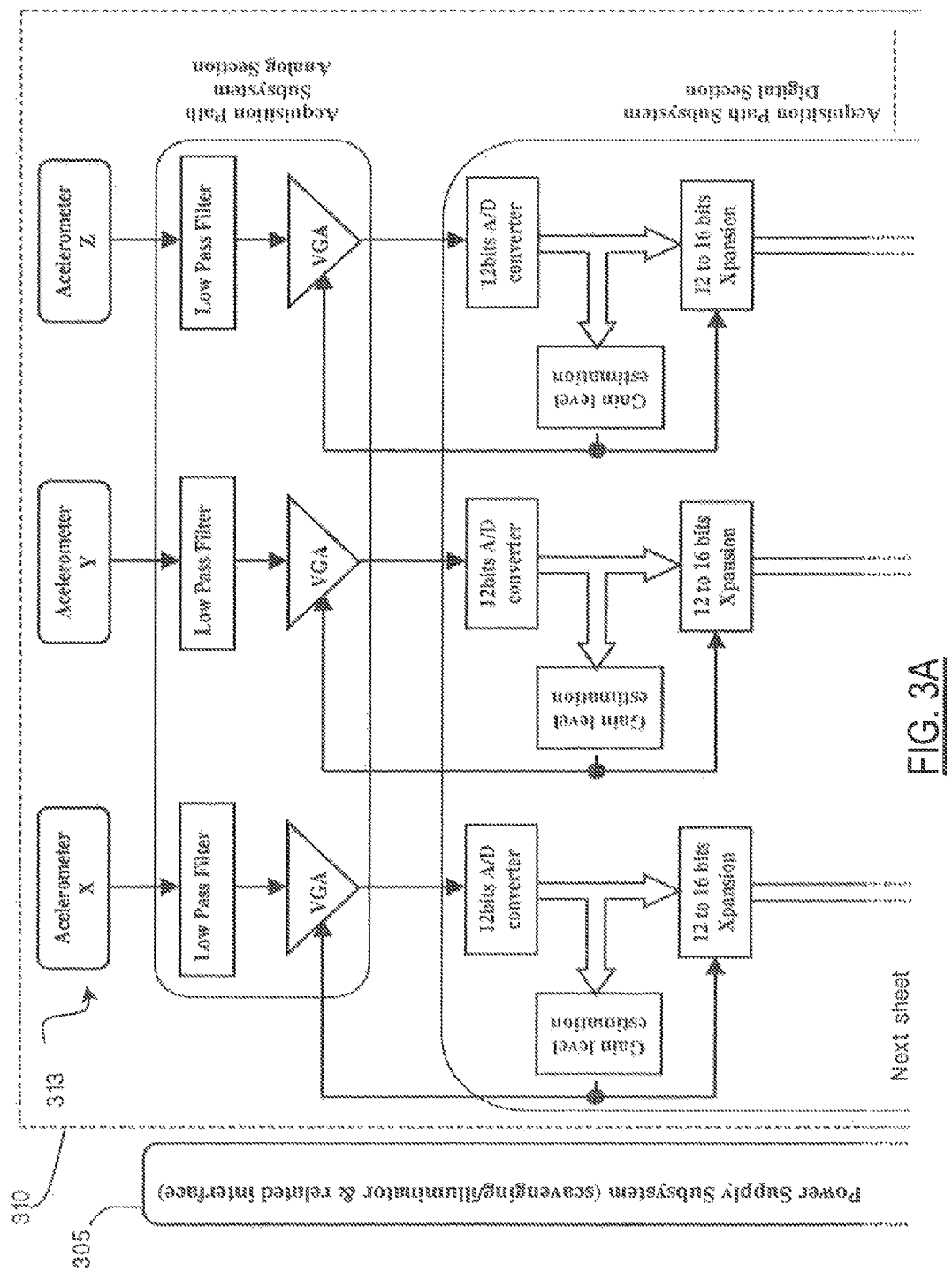
FIGS. 3A-3C are a functional block diagram of the architecture of a tyre sensor device according to an embodiment of the present invention.
Figure 3B:
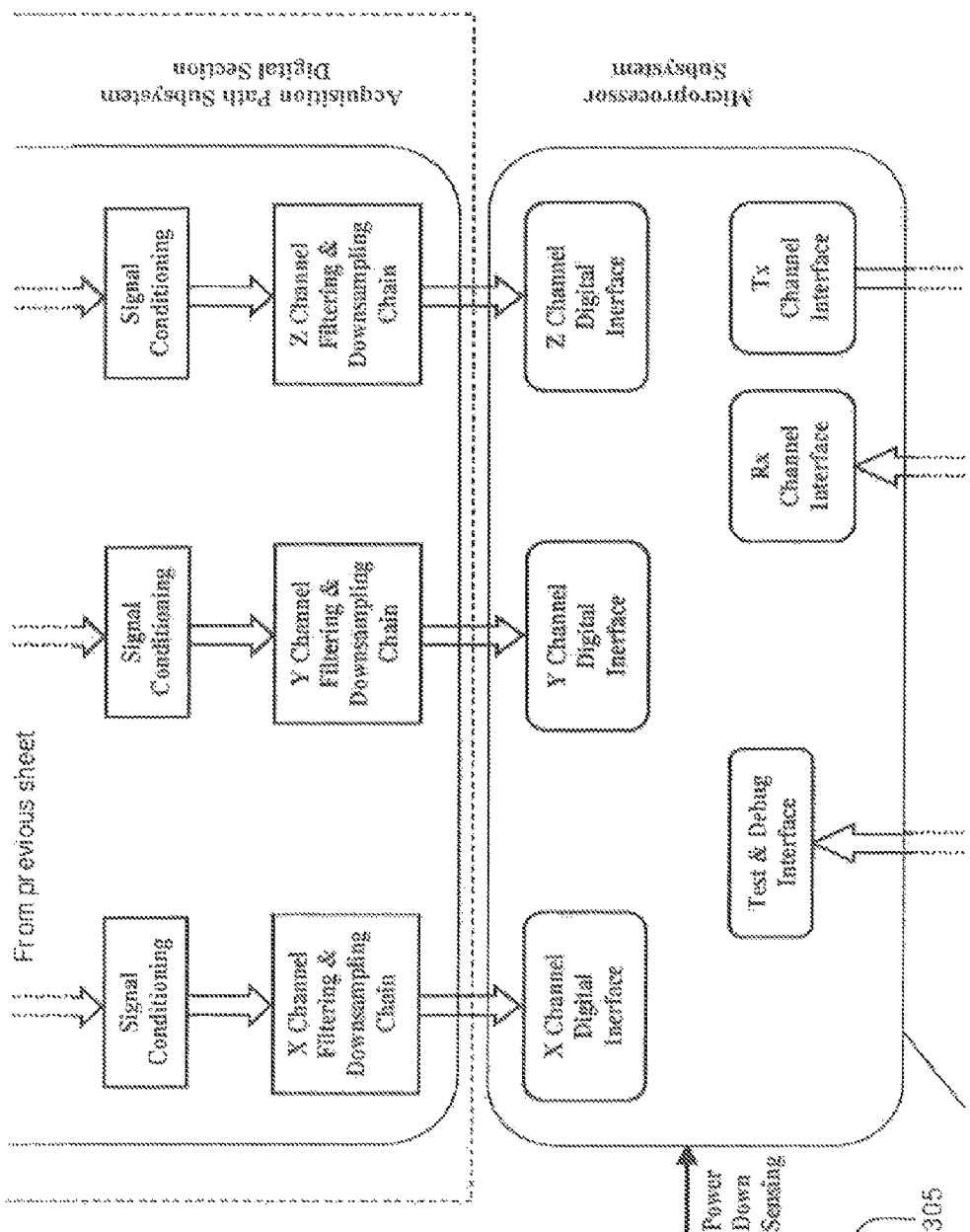
Figure 3C:
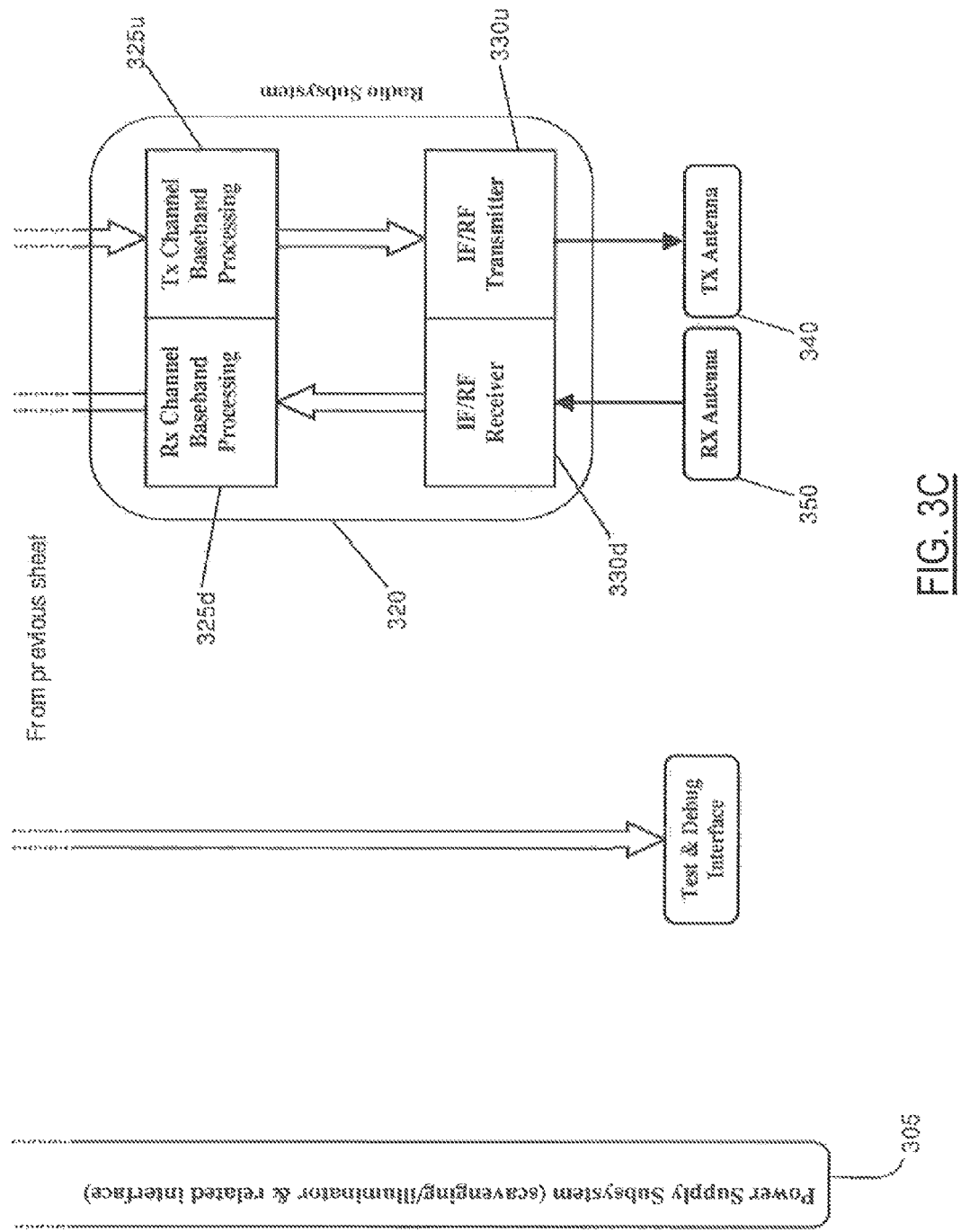

A block diagram of the architecture of a tyre sensor device or sensor node 109 is depicted in FIGS. 3A-3C.

The generic sensor node 109 is the in-tyre device with the tasks of acquiring data from the tyre, executing preliminary DSP (Digital Signal Processor) processing on them, such as signal conditioning and compensations, and sending data over the RF (RadioFrequency) link to the respective PAN coordinator 110. The sensor node 109 should have a practically unlimited lifetime (so as to be operational for the whole lifetime of the tyre, because replacing a sensor node or a portion thereof due e.g. to malfunctioning can be impractical or even impossible), small size and mass, be capable of operating in a wide temperature range (from −40° C. in winter up to 100° C. in summer), be robust to high accelerations (an object mounted on the tyre inner lining is subject to a radial acceleration of up to 3 g at 200 km/h of vehicle speed).

The sensor node 109 comprises several subsystems, namely: a power supply subsystem 305, a sensor and acquisition path subsystem 310, a control and data processing subsystem 315, a radio subsystem 320.

The power supply subsystem 305 may comprise a battery, however currently available battery technologies may not allow satisfying the long-life requirement for the sensor nodes. Alternative power supply subsystems 305 may provide for scavenging available power at the node, for example scavenging power from the mechanical deformation to which the tyre is subjected during use (e.g. vibrations, deflection at the tire footprint, etc.); electromagnetic, electrostatic, and piezoelectric methods may be exploited to convert mechanical motion into electricity, the amount of power generated by the energy scavenger depending on the technology chosen, on the size of the energy scavenger, and on the environmental conditions such as vibrations, elongation stresses, and temperature gradients. Another method for generating power may be based on electromagnetic coupling; possible methods of providing electromagnetic wireless power transfer include magnetic field coupling via inductive action between two coils, and magnetic field coupling via self-resonant coils, by placing an illuminator (a main powered antenna transferring electromagnetic power, via an RF link, to a remote device, wherein the power is collected by means of a suitable receiving antenna) on the wheel.

Figure 4:
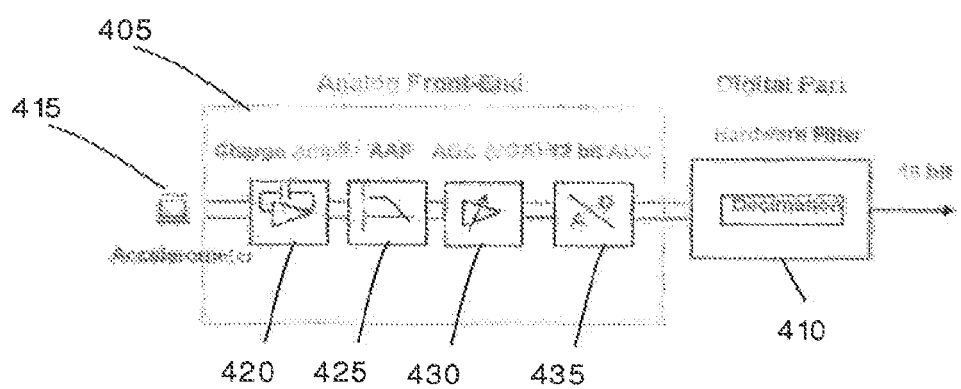
FIG. 4 is a functional block diagram of an acquisition subsystem of a tyre sensor device.

The sensor 313 in the sensor node 109 is for example a triaxial accelerometer, oriented so that the three axes measure signals in the radial, circumferential (tangential) and lateral direction; the sensor produces three data streams (X, Y and Z in FIGS. 3A-3C). An exemplary functional block diagram of the sensor and acquisition path subsystem 310 for one of the three data streams generated by the sensor 313 is depicted in FIG. 4. In the figure, the sensor (e.g., accelerometer) is denoted 415. The data acquisition path comprises an analog front-end section 405 and a digital section 410. The acquisition path subsystem is responsible for the transformation of the signal acquired by the sensor 400 into digital signals. The analog section 405 amplifies and filters the acquired signal from the sensor 400; the analog section comprises for example a charge amplifier 420, a filter 425, a Variable Gain Amplifier (VGA) 430 (implementing an automatic gain control to keep the Signal-to-Noise Ratio—SNR—constant, even at low levels of signal dynamics), and an Analog to Digital Converter (ADC) 435. Then, digitally converted analog data are passed to the digital section 410. Over-sampling techniques may be used, thus signals may be acquired at sampling frequencies higher then their final sampling rate. The digital section is responsible for signal conditioning, in order to correct possible accelerometer imperfections such as offset and bias. In the digital section 410, data are filtered and decimated to the final sampling rate.

Coming back to FIGS. 3A-3C, the control and data processing subsystem 315 may comprise a single-core DSP responsible of managing the communication protocol, all the functions that control the activity of the sensor node, such as command execution, system monitoring and diagnostics, and the DSP functions like estimation and compensation of signal non-linearity, estimation and compensation of cross-talk among the different accelerometer signals, estimation of bias and offset, data compression for reducing the input throughput, algorithms required by the communication protocol.

The radio subsystem 320 is responsible for transforming digital data to be sent to the PAN coordinator 110 (on an uplink channel) into analog signals modulated over the desired transmission channel, and for receiving analog data from the PAN coordinator 110 (on a downlink channel) over the transmission channel, and transforming the received data into baseband digital data. The radio subsystem 320 comprises, for the uplink channel, a software driver 325$u$ and a hardware radio transmitter 330$u$, the latter being coupled to a transmit antenna 340. For the downlink channel, the radio subsystem 320 comprises a hardware radio receiver 330$d$, coupled to a receiving antenna 350, and a software driver 325$d$. The transmitter 330$u$ implements the physical layer components, related to channel coding/decoding, modulation and conversions between analog signals to/from digital data, synchronization, and generation of events on a fine-grain time scale (bit or chip level). The software drivers 325$u$ and 325$d$ implement the MAC (Media Access Control) layer and higher network layers components, and manage all events and synchronization requirements at a coarse-grain time scale (frame level). Amplifiers are included in the radio transmission or reception channel, to increase the power of the signal before transmission or before processing.

As mentioned in the foregoing, different radio technologies are used for the communications between the generic sensor node 109 and the respective PAN coordinator 110 in uplink and downlink; this choice reflects on the architecture of the radio subsystem 320 of the sensor node 109, and the corresponding radio subsystem of the PAN coordinator 110.

As discussed in the foregoing, the communication environment in the PAN of FIG. 1, particularly between the sensor nodes 109 and the PAN coordinator 110, is very harsh. On the other hand, a large amount of data needs to be transmitted in uplink, thus transmission at a fairly high data rate, greater than 1 Mbit/s, should be possible; at the same time, the power consumption should be as little as possible, due to the power supply limitations at the sensor nodes, particularly when energy scavenging is used.

Thus, for the uplink transmission, i.e. for the transmission from the sensor node 109 to the PAN coordinator 110, Ultra-Wide-Band (UWB) transmission is adopted.

UWB is a technology that is suitable for low-cost, low-power, short-range wireless data transmission. UWB transmission is robust against inter-symbol interference due to multi-path interference, even severe, and lack of line-of-sight communications. In addition to this, UWB transmission hides signals below the noise floor causing little or no interference to existing systems and mitigates the performance degradation due to narrow-band interference. Low power consumption is achieved thanks to the fact that high power pulses (the power needs to be sufficiently high for the pulses to emerge from the noise floor) are transmitted but using a low duty cycle, so that the average transmitted power remains low.

Two broad categories of UWB radio systems are known in the art: Impulse Radio (IR) and Multi-Band Orthogonal Frequency-Division Multiplexing (MB-OFDM). IR systems directly generate the UWB frequency spectrum via ultra-short pulses, whereas MB-OFDM is an adaptation of traditional narrowband OFDM technology that forms an aggregate equivalent bandwidth of at least 500 MHz.

The United States Federal Communications Commission (FCC) and the International Telecommunication Union-Telecommunication Standardization Sector (ITU-T) define UWB as any radio technology for which the emitted signal bandwidth exceeds the lesser of 500 MHz and 20% of the center frequency of the modulating signal that forms the pulse, in case of IR, or of the carrier wave in case of OFDM. In 2002, FCC has allocated the 3.1-10.6 GHz band for the unlicensed use of UWB applications; however, these unlicensed UWB systems have to limit energy emission to follow an FCC-defined spectral mask, so that no interference is caused to other existing technologies in the band; in particular, a limit of −41 dBm/MHz on the whole 3.1-10.6 GHz band is set for most devices making use of UWB technology. Conceptually similar energy emission limits in defined spectral masks have been adopted in Europe and in other Countries of the world, although differences exist in the shape of the spectral mask and in the values of the emission limits; for example, in the European Union a maximum mean e.i.r.p. (Equivalent Isotropic Radiated Power) density of −41.3 dBm/MHz is allowed in the 3.4-4.8 GHz band, provided that a low duty cycle limit is satisfied. In Japan, the allowed frequency bands are 3.4-4.8 GHz and 7.25-10.25 GHz.

Choosing to operate in the frequency band 4.2-4.8 GHz is advantageous, because in this way it is possible to comply with the current different regulations.

IR UWB technology is better suited to be used for the uplink communications between the sensor nodes 109 and the PAN coordinators 110, thanks to the simple architecture of the uplink transmitter (the part that resides on the sensor nodes 109), which enables low-power high data rate uplink transmission from the sensor nodes 109 to the PAN coordinators 110 on the vehicle.

In IR UWB, the main pulse is first generated, whose frequency response fits in the baseband equivalent of the FCC spectral mask (or corresponding masks defined by other regulatory authorities in different Countries). The pulse is then up-converted to the desired carrier frequency, obtaining an amplitude modulated RF signal, whose envelope is the shape of the pulse.

Any pulse shape can in principle be used for UWB systems, provided that the frequency response satisfies the energy emission limits. Possible pulse shapes for IR UWB systems are Gaussian pulses and their ($1^{st}$ or $2^{nd}$) derivatives:

$$x(t) = \frac{A}{\sqrt{2\pi\sigma}} \exp\left(-\frac{t^2}{2\sigma^2}\right)$$

where A is the amplitude, and σ controls the pulse length.

The frequency spectra of these pulses have a good behavior compared to other pulse shapes. However such pulses are quite difficult to generate and/or control, and a sophisticated transmission-line based design would be required; the center frequency of a Gaussian pulse is also hard to control, since even the slightest change in pulse shape, of the order of picoseconds, can shift the center frequency by hundreds of MHz. In addition, generating Gaussian pulses that fit in the FCC (or equivalent) spectral mask is not trivial; some filtering would be needed for the pulse, but this would increase the transmitter complexity, whereas in order to reduce power consumption and size, the uplink transmitter on the sensor node 109 should be as simple as possible.

Figure 5:
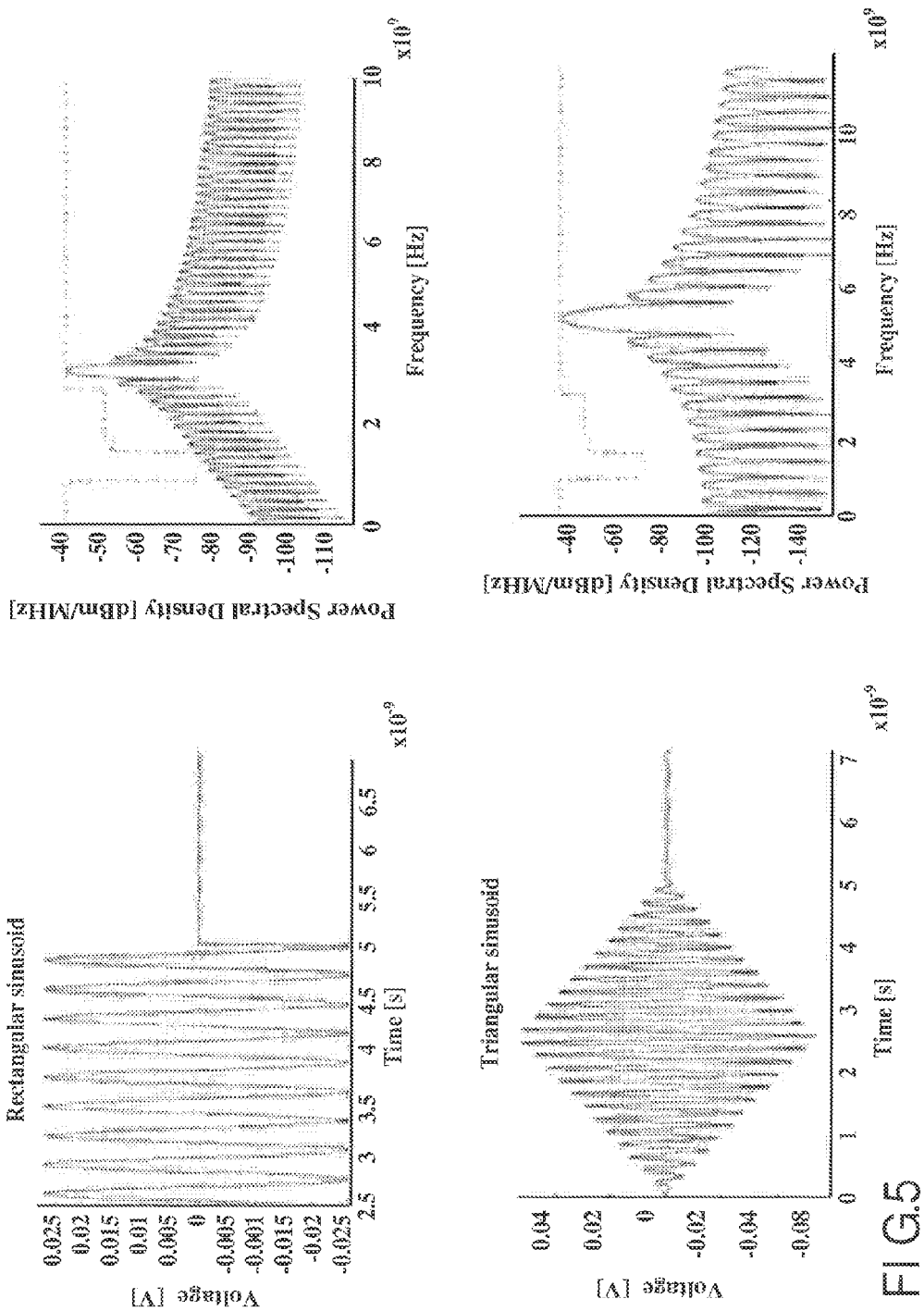
FIG. 5 depicts comparative time-domain and frequency-domain diagrams of a rectangular sinusoid pulse and of a triangular sinusoid pulse usable in an IR UWB transmission scheme.

Other possible pulse shapes are rectangular and triangular. Pulses having a rectangular and triangular shape can be generated without the need of filters or other hardware, and their center frequency is easy to control. Moreover, the pulses having a triangular shape better fit in the FCC spectral mask and offers more bandwidth in the main lobe of the frequency response, as depicted in FIG. 5, where a comparison is provided between the time and frequency domain of rectangular envelope pulses (upper diagrams in the figure) and triangular envelope pulses (lower diagram in the figure).

For the downlink communications between the PAN coordinators 110 and the sensor nodes 109, only a low data rate (throughput) needs to be sustained, because downlink transmission from the PAN coordinator 110 to sensor node 109 is used primarily to transmit minimal information for coordinating the activities of the sensor nodes (e.g. data acquisition and/or transmission scheduling, packet retransmissions, synchronization etc.), so as to reduce collisions between transmissions from multiple nodes or, more generally, to increase signal-to-noise ratio on the uplink. For example, a throughput of up to 100-200 Kbit/sec may be sufficient for these purposes. Thus, narrowband transmission, combined with an ultra-low power receiver on the sensor nodes 109 (for saving energy at the sensor nodes) is adopted. For the purposes of the present description, by "narrowband" transmission it is intended a transmission with a bandwidth significantly lower of the UWB bandwidth, of the order of e.g. 80-100 MHz or less, preferably on a carrier of few GHz, e.g. 2.4-2.5 GHz; this frequency range falls in the unlicensed spectral bands that, according to the most common regulations (e.g., ITU-R) are referred to as Instrument, Scientific and Medical (ISM) bands.

The combination of UWB transmission technique for the uplink communications, and non-UWB narrowband transmission for the downlink communications, allows overcoming the problems of robust communication between the sensor nodes and the PAN coordinators in a harsh environment and with very limited power consumption, especially at the sensor nodes.

Figure 6:
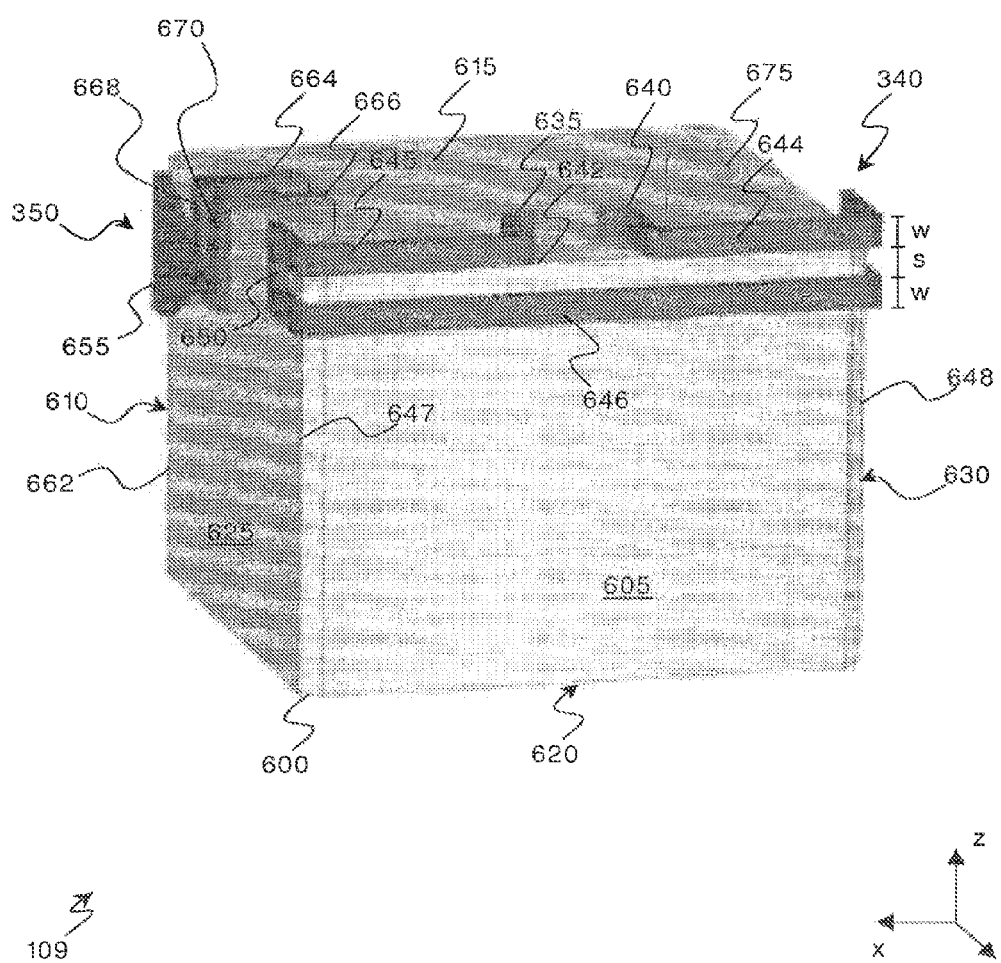
FIG. 6 is a perspective view of a sensor node equipped with a transmit antenna and a receiving antenna according to an embodiment of the present invention.

FIG. 6 is a perspective view of a sensor node 109 equipped with a transmit antenna 340 for the uplink transmission and a receiving antenna 350 for the downlink transmission according to an embodiment of the present invention.

In the embodiment illustrated in FIG. 6, all the electronic circuitry of the sensor node 109 is included in a package 600 having a substantially cubic shape, with the transmit antenna 340 and the receiving antenna 350 that are located on external faces of such cubic package 600. The package 600 is preferably made with a suitable insulating and robust material, such as a thermoplastic polymer (e.g., polyether ether ketone).

Making reference to the three orthogonal directions referred to as x, y and z in FIG. 6, the package 600 has a frontal face 605 and a back face 610, which are parallel to the plane defined by the directions x and z (the back face 610 being not visible in figure). Furthermore, an open top face 615 and a bottom face 620 (not visible in figure) of the package 600 are parallel to the plane defined by the directions x and y, while a first lateral face 625 and a second lateral face 630 (not visible in figure) are parallel to the plane defined by the directions y and z. For example, the faces of the package 600 may have sides of the order of 1-2 cm.

Figure 7:
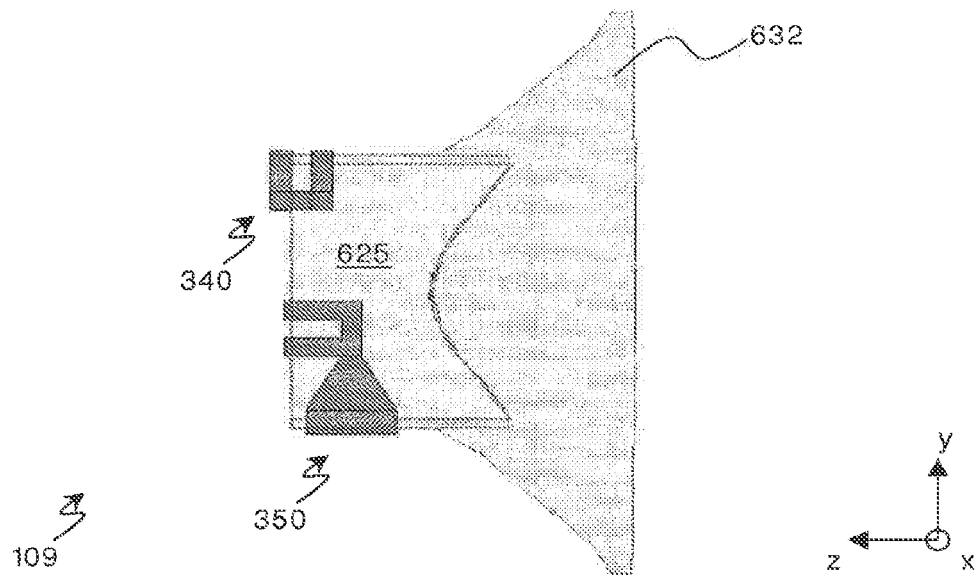
FIGS. 7, 8 and 9 are side views of the sensor node illustrated in FIG. 6.
Figure 8:
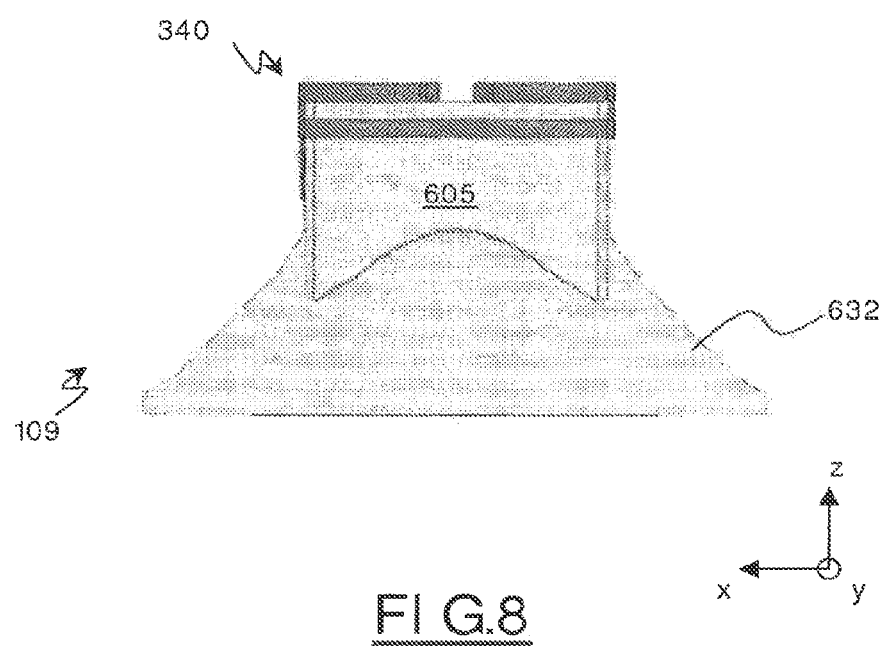
Figure 9:
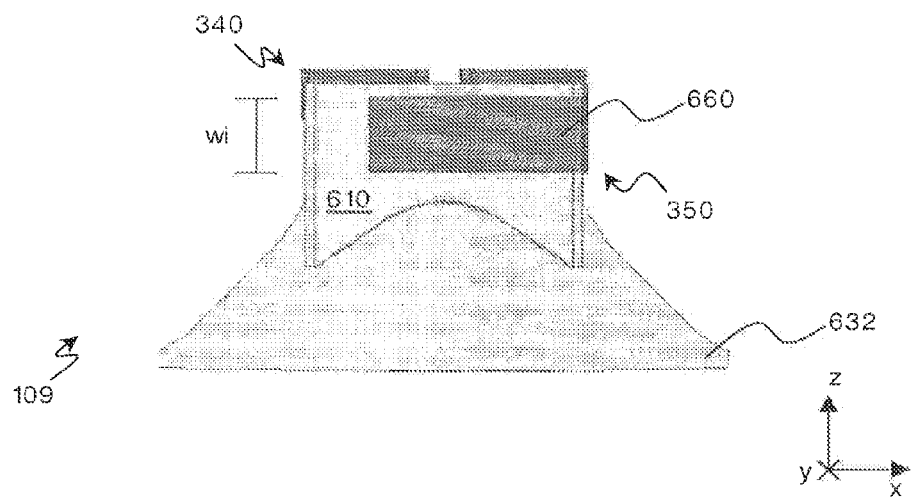

FIGS. 7, 8 and 9 are side views of the sensor node 109 illustrated in FIG. 6. Particularly, FIG. 7 is a side view from the plane defined by the directions y and z showing the first lateral face 625, FIG. 8 is a side view from the plane defined by the directions x and z showing the frontal face 605, and FIG. 9 is a side view from the plane defined by the directions x and z showing the back face 610. Unlike the one shown in FIG. 6, the sensor node 109 shown in FIGS. 7, 8 and 9 is fitted on a proper support 632 adapted to support the node itself when inserted in the vehicle tyre.

According to embodiments of the present invention, at least one among the transmit antenna 340 and the receiving antenna 350 is a conformal antenna, shaped to adhere to the surfaces of the package 600.

Particularly, in the embodiment of the invention illustrated in FIGS. 6-9, the transmit antenna 340 is a folded dipole lying on the upper portion of the frontal face 605 and having lateral ends that are folded in such a way to lie on the two lateral faces 625, 630. Still according to the exemplary invention embodiment shown, the receiving antenna 350 is a strip monopole which is folded so as to lie on the upper portions of both the lateral face 625 and the back face 610.

Particularly, the transmit antenna 340 is derived from a thick folded dipole antenna, having two feeding terminals 635 and 640 located on the open top face 615 of the package 600 for being fed by the hardware radio transmitter of the sensor node 109 (i.e., the circuit schematically illustrated in FIGS. 3A-3C by the functional block 330u but not shown in FIGS. 6-9), being located within the package 600 of the sensor node 109 itself.

According to the embodiment of the present invention illustrated in FIGS. 6-9, the transmit antenna 340 comprises two main radiator elements formed by conductive strips longitudinally extending parallel to the edge 642 that joins the open top face 615 with the frontal face 605 of the package 600 (i.e., parallel to the direction x), and having a same width w (along the direction z). Specifically, such two main radiator elements comprise an upper radiator element that is split in the center to form a first upper element 644 connected to the feeding terminal 635 and a second upper element 645 connected to the feeding terminal 640, and a lower radiator element 646. The first and second upper elements 644, 645 are located on the edge 642 so as to protrude from the open top face 615 of the package 600 along the direction z by an amount that is substantially equal to their width w. The lower radiator element 646 is located on the frontal face 605 of the package 600 below the upper radiator element being spaced apart from the latter of a distance s (along the direction z) from the first and second upper elements 644, 645. The lateral ends of the lower radiator element 646 and of the first and second upper elements 644, 645 are connected to each other to form a continuous loop from the feeding terminals 635, 640. According to an embodiment of the present invention, the antenna's radiators are folded around the edges 647, 648 of the package 600 joining the frontal face 605 with the lateral faces 625 and 630, respectively, to follow the package 600 structure, and are connected to each other by means of linking elements located on the lateral faces 625, 630 of the package 600. Particularly, in the coordinate system shown in FIGS. 6-9, both a first end of the lower radiator element 646 and the end of the first upper element 644 that is not connected with the feeding terminal 635 are folded along the direction opposite to the direction y and connected to each other by means of a linking element 650 formed by a conductive strip vertically extending along the direction z; similarly, both the other end of the lower radiator element 646 and the end of the second upper element 645 that is not connected with the feeding terminal 640 are folded along the direction opposite to the direction y and connected to each other by means of a linking element (not visible in the figures) which, similarly to the linking element 650, is formed by a conductive strip vertically extending along the direction z.

The peculiar shape of the transmit antenna 340 (i.e., the folding at the ends thereof) allows the installation thereof on very small support bodies, like the package 600, without having to exhibit protruding elements that would make the sensor node's structure unsuitable for being installed inside a vehicle tyre. According to an embodiment of the present invention, the transmit antenna 340 is exploited for transmitting UWB signals with a bandwidth of 500 MHz around a central frequency of 4.5 GHz. Being derived from a folded dipole antenna, the transmit antenna 340 does not require any ground plate, and has a very high impedance (theoretically, four times the impedance of an equivalent, unfolded dipole). Moreover, such transmit antenna 340 exhibits a good matching capability toward balanced feeding lines with high impedance over a wide band, with a return loss better than −10 dB. Thanks to its high input impedance, the transmit antenna 340 is not negatively affected by the presence of metallic elements in the proximity of the antenna itself, such as the metallic portions of the electronic circuitry included in the package 600. Moreover, the folding at the ends of the transmit antenna 340 improves the radiation pattern, especially filling the null along its axis (i.e., along the direction x).

Similar considerations apply if the transmit antenna 340 has a structure different from the one illustrated in the previous figures, provided that the antenna's radiators are folded around the edges of the package to follow the package 600 structure. For example, the two main radiator elements may have different widths (causing a further impedance variation). Moreover, the upper main radiator element may be located on the frontal face so as not to protrude from the open top face of the package; in this latter case, the frontal face 605 of the package 600 may be provided with proper slits for the passage of the feeding terminals.

According to an embodiment of the invention, the receiving antenna 350 is a strip monopole which is folded in such a way to have a first main section 655 located on an upper portion of the lateral face 625 and a second main section 660 located on an upper portion of the back face 610; the junction between such first section 655 and second section 660 is along the edge 662 of the package 600 joining the lateral face 625 with the back face 610 of the package 600. The receiving antenna 350 is provided with two feeding terminals 664 and 666 located on the open top face 615 of the package 600 for providing the received signals to the hardware radio receiver of the sensor node 109 (i.e., the circuit schematically illustrated in FIGS. 3A-3C by the functional block 330d, but not shown in FIGS. 6-9), being located within the package 600 of the sensor node 109 itself. Two conductive strips 668 and 670 vertically extend—along the direction z—on the lateral face 625 for connecting the feeding terminals 664 and 666, respectively, with an end of the first section 655 of the receiving antenna 350. The first section 655 of the receiving antenna 350 is tapered, having a width—along the direction z—that is lower at the end thereof that is connected to the strips 668, 670 and increases until reaching its maximum extension wi on the edge 662 joining the lateral face 625 with the back face 610. The second section 660 of the receiving antenna 350 has a rectangular shape, extending on the back face 610 from the edge 662 along the direction opposite to the direction x, with a constant width—along the direction z—equal to wi.

According to an embodiment of the present invention, the receiving antenna 350 is exploited for receiving ISM signals with a bandwidth of 80 MHz around a central frequency of 2.44 GHz. Thanks to the presence of the folding, the receiving antenna 350 can be installed on very small support bodies, like the package 600, without having to exhibit protruding elements that would make the sensor node's structure unsuitable for being installed inside a vehicle tyre. Being an antenna of the monopole type, the receiving antenna 350 requires to be fed (through the feeding terminals 664 and 666) in an unbalanced way; moreover, an antenna of such type would require the presence of a suitable ground plane. For these purposes, while the feeding terminal 664 is directly connected to the hardware radio receiver included within the sensor node 109 for providing the received signals, the feeding terminal 666 is connected to a terminal (not shown in the figures) providing the ground (reference) voltage of the hardware radio receiver itself. In this way, the receiving antenna 350 is fed in an unbalanced way, and at the same time all the conductive elements of the hardware radio receiver connected to the terminal providing the ground voltage which is connected in turn to the feeding terminal 666 act as a whole as a ground plate, thus avoiding to install a dedicated ground plate in the sensor node 109. It has to be appreciated that the proposed receiving antenna 350 exhibits a good matching capability toward unbalanced feeding lines (such as the one connected to the feeding terminals 664 and 666) with high impedance over a wide band, with a return loss better than −10 dB. The main radiating portion of the receiving antenna 350—i.e., the second section 660 thereof—and the transmit antenna 340 are located on opposite faces of the package 600, so as to advantageously reduce any electromagnetic coupling between the two antennas.

Similar considerations apply if the receiving antenna 350 has a structure different from the one illustrated in the previous figures, provided that the antenna's surface is folded around the edges of the package to follow the package 600 structure. For example, the second main section 660 may extend along the whole back face 610 length (along the direction x) so that the receiving antenna 350 comprises a further section extending along the lateral face 630. Moreover, instead of having a constant width along the direction z, the second main section 660 may have a tapered width, or may follow a different profile (such as a sinusoidal or saw-toothed profile).

Figure 10:
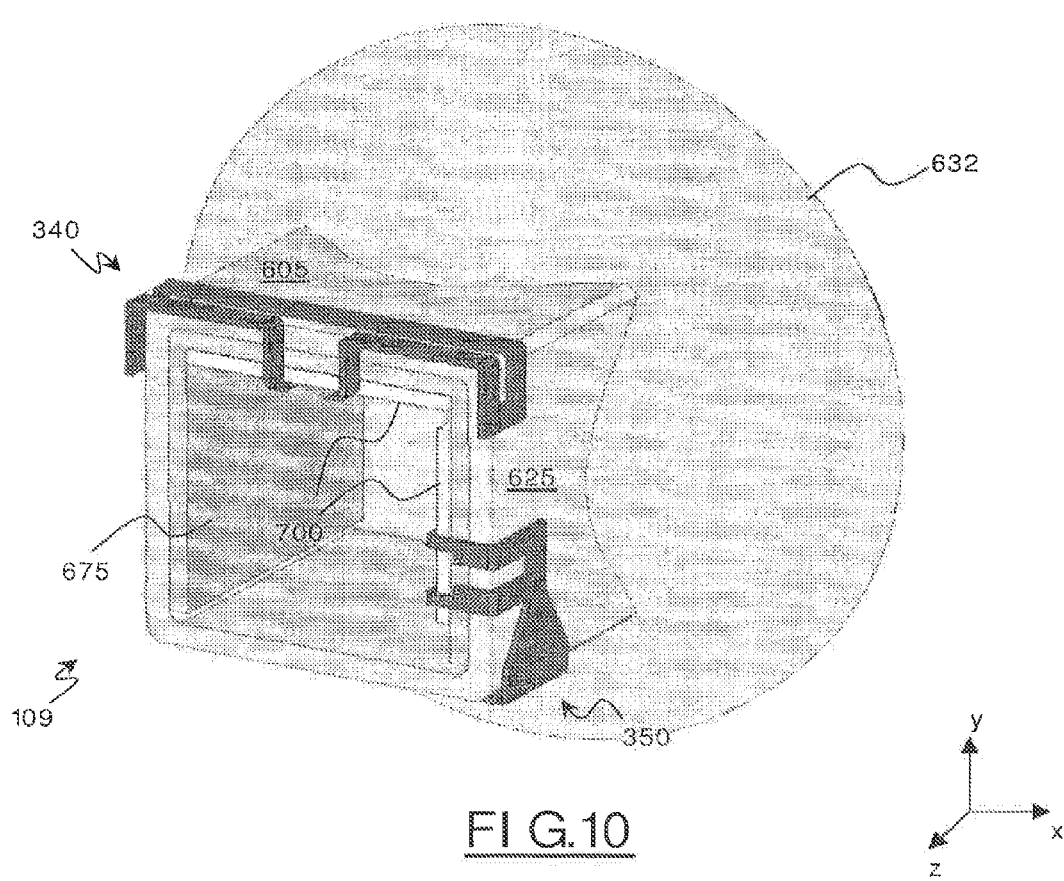
FIG. 10 is a further perspective view of the sensor node of FIGS. 6-9.

According to an embodiment of the present invention, in order to shield the antennas 340 and 350 from the presence of metallic elements within the sensor node 109, a shielding sheet 675 is inserted inside the package 600 itself. Particularly, as it can be seen in FIG. 10—the shielding sheet 675 is located in such a way to cover from the inside of the package 600 the frontal face 605 and the lateral faces 625 and 630. The shielding sheet 675 is made of a magnetically loaded dielectric sheet, such as ferrite or any other material having an equivalent electromagnetic shielding property.

Making again reference to FIG. 10, according to an embodiment of the present invention all the electronic circuitry of the sensor node 109, globally identified with the reference 700, is arranged on the inner surface of the shielding sheet 675. In order to protect the electronic circuitry 700 from mechanical and environmental stresses, and to increase the overall structural resistance of the sensor node 109, the inside of the package 600 may be advantageously filled with a casting of a suitable protective resin.

A preferred positioning of the proposed sensor node 109 within a vehicle tyre 104 includes arranging the frontal face 605 of the package 600 to be parallel to the plane defined by the circumferential direction of the tyre 140. In this case, it is preferred to orientate the frontal face 605 (and, thus, the transmit antenna 340) toward the outside of the vehicle, leaving the back face 610 (and, thus, the receiving antenna 350) to face toward the vehicle.

Alternatively, the sensor node 109 may be arranged so that the frontal face 605 of the package 600 is perpendicular to a plane defined by the circumferential direction of the tyre 140.

However, nothing prevents to arrange the sensor node 109 according to different orientations, since the proposed transmit antenna 340 and receiving antenna 350 have a quasi-omnidirectional radiation pattern.

Figure 11:
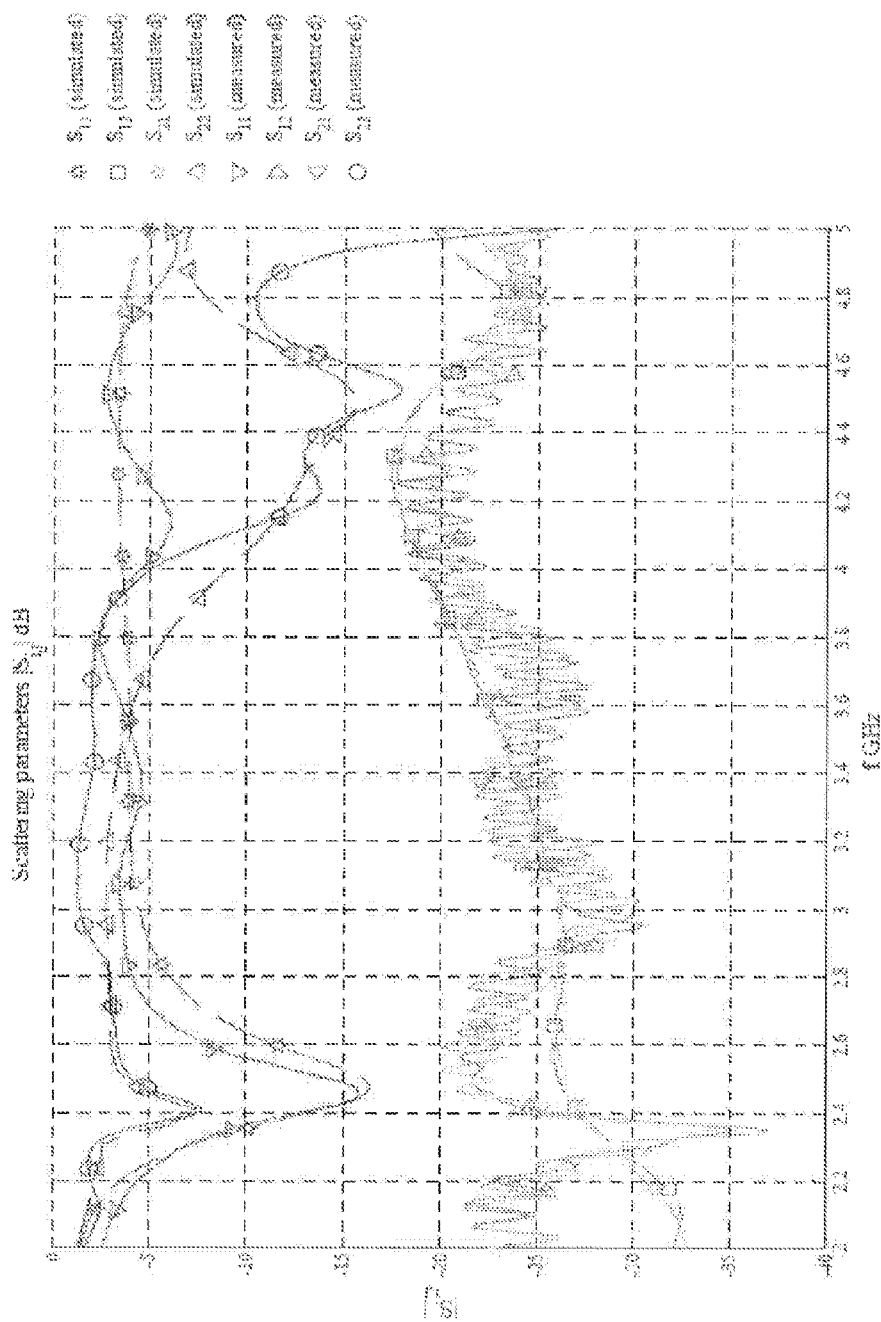
FIG. 11 is a diagram illustrating the magnitude of the scattering parameters of the transmit antenna and of the receiving antenna illustrated in FIGS. 6-10.

FIG. 11 is a diagram illustrating the magnitude (in decibel) of the scattering parameters $S_{ij}$ (i=1, 2, j=1, 2) of an exemplary antenna system comprising the proposed transmit antenna 340 and receiving antenna 350; particularly, index "1" corresponds to the port of the receiving antenna 350 and index "2" corresponds to the port of the transmit antenna 340.

Figure 12:
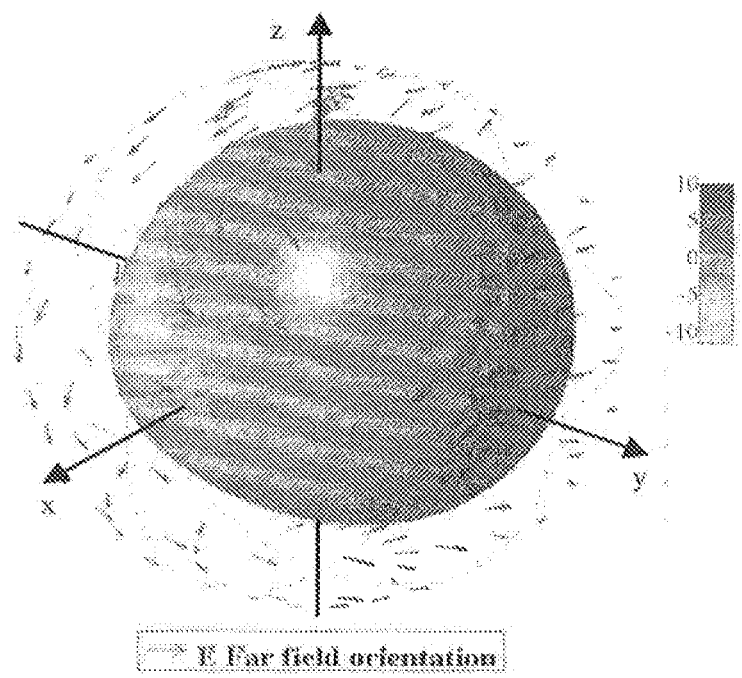
FIG. 12 is a three-dimensional diagram illustrating the directivity of the transmit antenna illustrated in FIGS. 6-10 when transmitting at the frequency of 4.5 GHz.

FIG. 12 is a three-dimensional diagram illustrating the directivity (dBi scale) of an exemplary transmit antenna 340 according to an embodiment of the present invention when transmitting at the central frequency of the UWB band (4.5 GHz). It can be observed that the directivity of such transmit antenna 340 decreases by approaching a direction substantially corresponding to the direction z.

Figure 13:
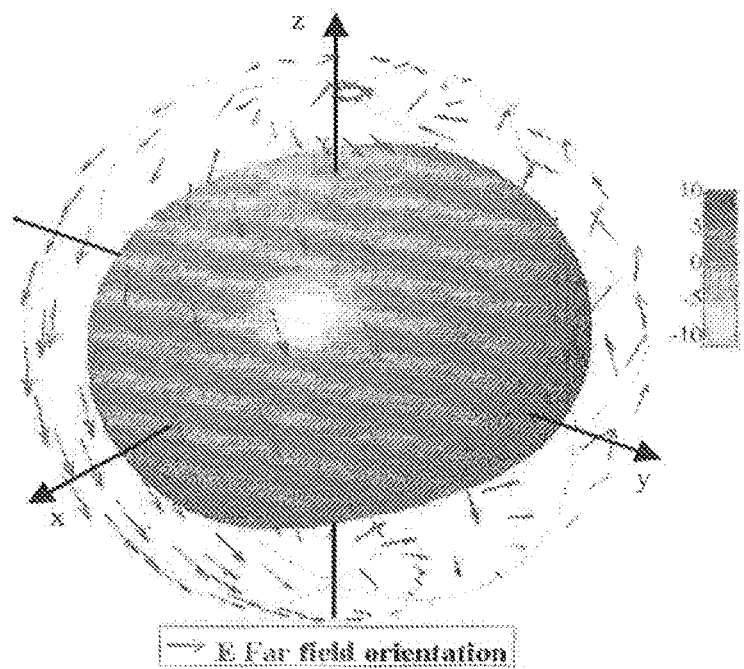
FIG. 13 is a three-dimensional diagram illustrating the directivity of the receiving antenna illustrated in FIGS. 6-10 when receiving at the frequency of 2.44 GHz.

FIG. 13 is instead a three-dimensional diagram illustrating the directivity (dBi scale) of an exemplary receiving antenna 350 according to an embodiment of the present invention when receiving at the central frequency of the ISM band (2.44 GHz). In this case, it can be observed that the directivity of the receiving antenna 350 decreases by approaching a direction substantially corresponding to the direction x.

The proposed antenna system has been widely tested, showing that the radiation patterns of both the transmit antenna 340 and the receiving antenna 350 are very satisfactory even when the sensor node 109 is installed within a vehicle tyre. It has to be appreciated that the system of tyre sensors in which the proposed antennas is directed to be employed provides for transmissions and receptions of signals at very short distance, typically lower than one meter. Consequently, instead of examining the radiation pattern in the so-called far field conditions, it is more useful to analyze the behavior of the radiation pattern on a given surface (such as a flat plane) at a short distance (e.g., few tens of cm) from the sensor node itself.

Figure 14A:
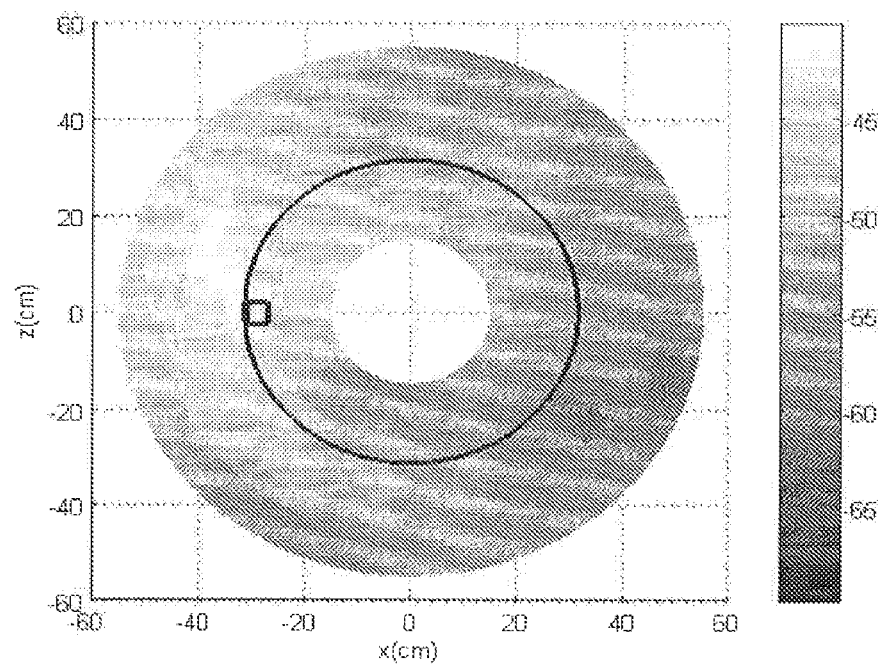
FIGS. 14A and 14B show the electromagnetic field distribution generated by the transmit antenna illustrated in FIGS. 6-10 measured on a plane close to the wheel housing the sensor node.
Figure 14B:
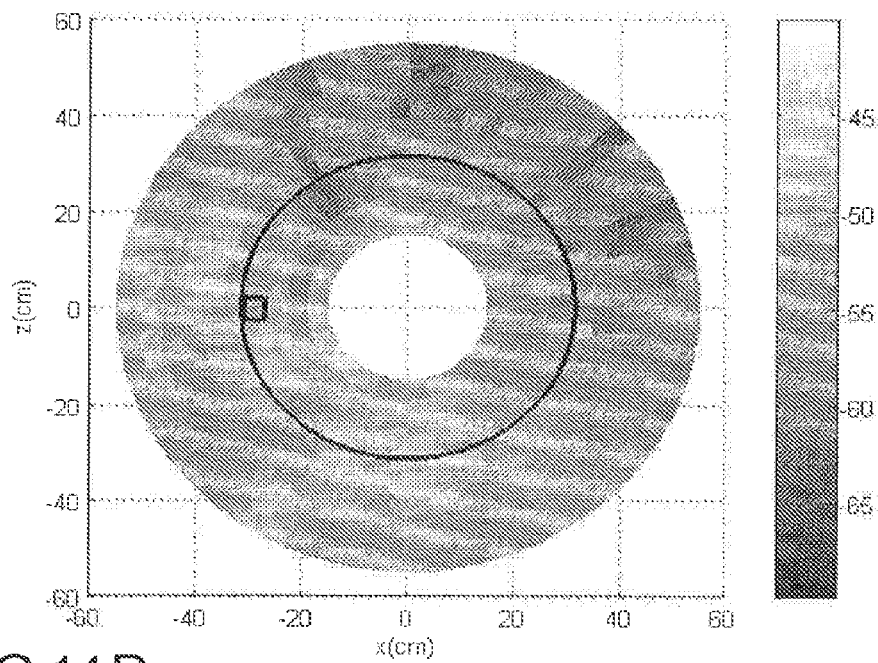

For example, FIGS. 14A and 14B illustrate the measured electromagnetic field distribution (dB scale) generated by the transmit antenna 340 at a frequency of 4.5 GHz, taken on a plane parallel to the side of the tyre wherein the sensor node 109 is fitted, and at distance of about 20 cm from such side of the tyre; while in FIG. 14A the effect of the tyre has been removed, the electromagnetic field distribution shown in FIG. 14B exhibits the influence due to the presence of the tyre.

Figure 15A:
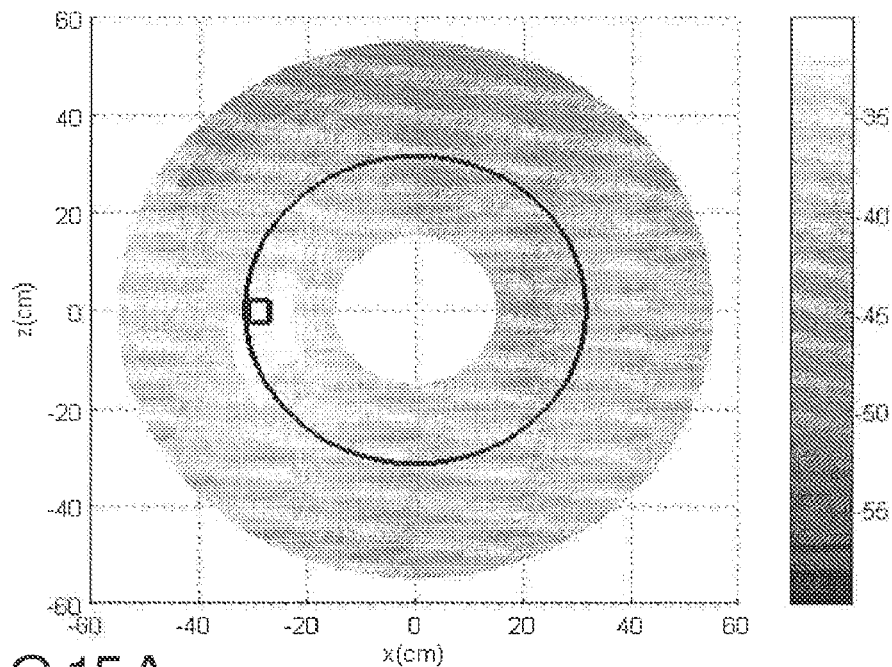
FIGS. 15A and 15B show the electromagnetic field distribution of the receiving antenna illustrated in FIGS. 6-10 measured on a plane close to the wheel housing the sensor node.
Figure 15B:
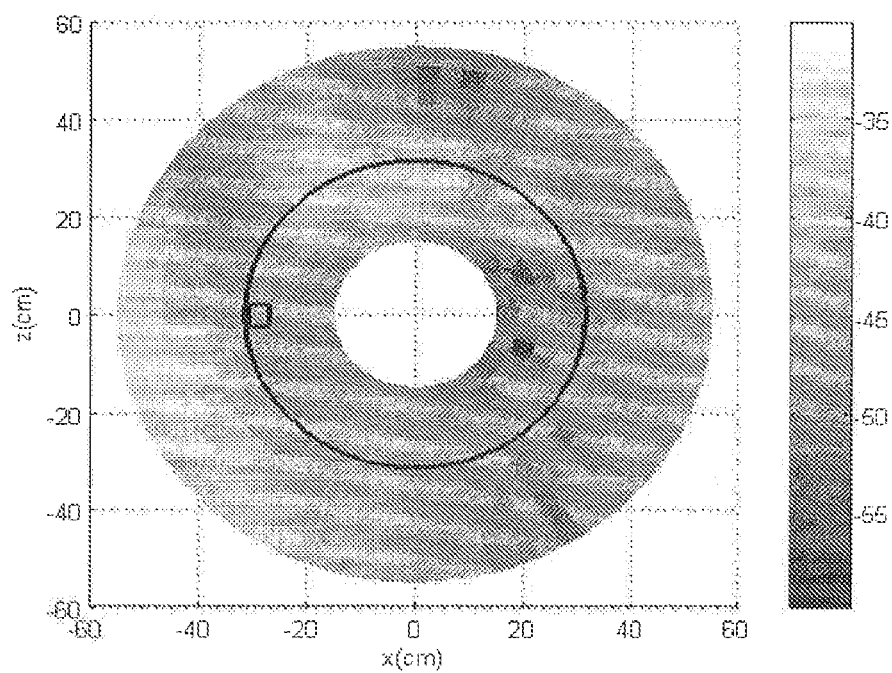

Similarly, FIGS. 15A and 15B illustrate the measured electromagnetic field distribution of the receiving antenna 350 at a frequency of 2.44 GHz, without and with the tyre, respectively.

It can be observed from the above that the average difference between the maximum radiation power in presence of the tyre and in absence of the tyre is equal to 6.5 dB at the transmission frequency of 4.5 GHz, while it is equal to 4.4 dB at the receiving frequency of 2.44 GHz.

The previous description presents and discusses in detail several embodiments of the present invention; nevertheless, several changes to the described embodiments, as well as different invention embodiments are possible, without departing from the scope defined by the appended claims.

For example, although the proposed antenna system has been described in detail with reference to a sensor node included in a package having a cubic shape, the concepts of the present invention can be applied to different sensor node structures, having packages shaped in a different way, such as for example in the form of a parallelepiped, a generic a prism, a pyramidal frustum, a generic polyhedron or a cylinder, provided that the antenna(s) is/are shaped on the surfaces of said packages to follow the structure thereof.

Moreover, even if in the description reference has been made to antennas lying on external surfaces of the package, similar considerations apply if the antennas are located within the package, lying on internal surfaces thereof.

The invention claimed is:

1. A sensor device adapted to be associated with a vehicle wheel, comprising:
   a package enclosing at least one sensor and an electronic data processing apparatus;
   a transmit antenna arranged on the package for wireless transmission of data generated by the electronic apparatus; and
   a receiving antenna arranged on the package for wireless reception of data to be provided to the electronic apparatus, said transmit antenna and said receiving antenna being shaped to adhere to surfaces of the package, wherein:
   the transmit antenna is configured to transmit ultra wide band signals around a central frequency between 4.2 and 4.8 GHz, and
   the receiving antenna is configured to receive narrowband signals around a central frequency between 2.4 and 2.5 GHz.

2. The sensor device of claim 1, wherein:
   the package has a substantially polyhedral shape, and
   the transmit antenna and the receiving antenna are essentially arranged on opposite faces of the package.

3. The sensor device of claim 1, wherein:
   the transmit antenna is a folded dipole antenna, and
   the receiving antenna is a strip monopole antenna.

4. The sensor device of claim 3, wherein said transmit antenna comprises an upper radiator element and a lower radiator element longitudinally extending along a frontal face of the package.

5. The sensor device of claim 4, wherein:
   both the upper radiator element and the lower radiator element are folded around edges of the package so as to partially extend along lateral faces of the package; and
   the upper radiator element and the lower radiator element are connected to each other by means of corresponding linking elements.

6. The sensor device of claim 4, wherein the transmit antenna comprises first and second feeding terminals located on a top surface of the package and coupled to the electronic data processing apparatus, the upper radiator element comprising a first upper element connected to the first feeding terminal and a second upper element connected to the second feeding terminal.

7. The sensor device of claim 3, wherein said receiving antenna is a strip antenna comprising a first section located on a lateral face of the package and a second section located on a back face of the package.

8. The sensor device of claim 7, wherein the second section of the receiving antenna has rectangular shape, longitudinally extending on the back face of the package.

9. The sensor device of claim 8, wherein the receiving antenna comprises third and fourth feeding terminals located on a top surface of the package and coupled to the electronic apparatus, the first section of the receiving antenna being connected to said third and fourth feeding terminals.

10. The sensor device of claim 1, wherein the transmit antenna is configured to transmit ultra wide band signals with a bandwidth of 500 MHz or less.

11. The sensor device of claim 1, wherein the receiving antenna is configured to receive narrowband signals with a bandwidth of 100 MHz or less.

12. The sensor device of claim 1, wherein a shielding sheet is located inside the package for shielding transmit and receiving antennas from metallic parts located within the package.

13. The sensor device of claim 12, wherein the shielding sheet comprises a magnetically loaded dielectric material.

14. The sensor device of claim 7, wherein the transmit antenna comprises first and second feeding terminals located on a top surface of the package and coupled to the electronic apparatus, the upper radiator element comprising a first upper element connected to the first feeding terminal and a second upper element connected to the second feeding terminal, and wherein the transmit antenna is fed in a balanced way by the electronic apparatus through the first and second feeding terminals.

15. The sensor device of claim 8, wherein the receiving antenna comprises third and fourth feeding terminals located on a top surface of the package and coupled to the electronic apparatus, the first section of the receiving antenna being connected to said third and fourth feeding terminals, and wherein the receiving antenna is fed in an unbalanced way by the electronic apparatus through the third and fourth feeding terminals.

16. A vehicle wheel comprising:
 a rim; and
 a tyre fitted on said rim,
 said wheel further comprising at least one sensor device according to claim 1, associated with at least one among said rim and said tyre.

17. A vehicle tyre comprising an inner surface and at least one sensor device according to claim 1, placed on said inner surface.

\* \* \* \* \*